United States Patent
Kawai et al.

(10) Patent No.: US 11,664,541 B2
(45) Date of Patent: May 30, 2023

(54) BATTERY CELL SHORT CIRCUIT DETECTION DEVICE, METHOD, AND STORAGE MEDIUM

(71) Applicant: TOYOTA JIDOSHA KABUSHIKI KAISHA, Toyota (JP)

(72) Inventors: Toshihiro Kawai, Okazaki (JP); Shinichi Inoue, Okazaki (JP); Yasushi Kusaka, Toyota (JP); Toru Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 172 days.

(21) Appl. No.: 17/203,102

(22) Filed: Mar. 16, 2021

(65) Prior Publication Data
US 2021/0376397 A1 Dec. 2, 2021

(30) Foreign Application Priority Data
Jun. 2, 2020 (JP) .............................. JP2020-096172

(51) Int. Cl.
*H01M 10/48* (2006.01)
*B60L 58/22* (2019.01)

(52) U.S. Cl.
CPC .......... *H01M 10/482* (2013.01); *B60L 58/22* (2019.02); *B60L 2240/547* (2013.01); *B60L 2240/549* (2013.01); *H01M 2220/20* (2013.01)

(58) Field of Classification Search
CPC . H01M 10/482; H01M 2220/20; B60L 58/22; B60L 2240/547; B60L 2240/549
See application file for complete search history.

(56) References Cited

U.S. PATENT DOCUMENTS

| 10,608,453 B1* | 3/2020 | Partee .............. G01R 31/3832 |
| 2020/0006962 A1* | 1/2020 | Roumi .................... H02J 7/00 |

FOREIGN PATENT DOCUMENTS

| JP | 2018-102096 A | 6/2018 |
| JP | 2020068541 A * | 4/2020 |

OTHER PUBLICATIONS

English machine translation of Taniyama (JP 2020068541 A). (Year: 2020).*

* cited by examiner

*Primary Examiner* — Brian R Ohara
*Assistant Examiner* — Aaron J Salter
(74) *Attorney, Agent, or Firm* — Oliff PLC (57) ABSTRACT

A battery cell short circuit detection device includes: a control unit that controls operation of a direct current-direct current converter; a first acquisition unit that acquires a storage rate of the battery; a second acquisition unit that acquires a current flowing into the battery and a current flowing out of the battery when the direct current-direct current converter is operating; a third acquisition unit that acquires a terminal voltage value that is a voltage that appears at a terminal of the battery when the direct current-direct current converter is not operating; and a determination unit that determines presence or absence of the short circuit between the battery cells based on an average storage rate indicating an average value of the storage rate of the battery, an average inflow current value indicating an average value of the current flowing into the battery, and the terminal voltage value.

7 Claims, 4 Drawing Sheets

BATTERY CELL SHORT CIRCUIT DETECTION DEVICE, METHOD, AND STORAGE MEDIUM

CROSS-REFERENCE TO RELATED APPLICATION

This application claims priority to Japanese Patent Application No. 2020-096172 filed on Jun. 2, 2020, incorporated herein by reference in its entirety.

BACKGROUND

1. Technical Field

The present disclosure relates to a battery cell short circuit detection device used for a vehicle including a battery in which a plurality of battery cells are connected in series, a method, and a storage medium.

2. Description of Related Art

Japanese Unexamined Patent Application Publication No. 2018-102096 (JP 2018-102096 A) proposes a device for detecting the occurrence of a short circuit between battery cells in a battery in which a plurality of battery cells are connected in series. In this device, a relay is interposed between a first battery cell and a second battery cell continuous to each other among a plurality of battery cells. The device detects that a short circuit has occurred between the first and second battery cells based on a voltage difference between the two ends of the relay when the relay is opened.

SUMMARY

However, the device described in JP 2018-102096 A can only detect that a short circuit has occurred between the battery cells between which the relay is interposed. Therefore, if all short circuits that occur between the battery cells are to be detected, the number of relays are required corresponding to the total number of battery cells n minus 1 (=n−1), which raises an issue of high device cost. Thus, in a battery in which a plurality of battery cells are connected in series, there is room for studying a technique capable of detecting a short circuit between any adjacent battery cells while suppressing the device cost.

The present disclosure has been made in view of the above issue, and an object of the present disclosure is to provide a battery cell short circuit detection device and the like capable of detecting a short circuit that occurs between battery cells while suppressing the device cost.

In order to solve the above problems, a first aspect of the technology disclosed herein is a battery cell short circuit detection device for detecting a short circuit between battery cells in a battery in which a plurality of battery cells are connected in series. The battery cell short circuit detection device includes: a control unit that controls operation of a direct current-direct current converter that supplies electric power to the battery; a first acquisition unit that acquires a storage rate of the battery; a second acquisition unit that acquires a current flowing into the battery and a current flowing out of the battery when the direct current-direct current converter is operating; a third acquisition unit that acquires a terminal voltage value that is a voltage that appears at a terminal of the battery when the direct current-direct current converter is not operating; and a determination unit that determines presence or absence of the short circuit between the battery cells based on an average storage rate indicating an average value of the storage rate of the battery, an average inflow current value indicating an average value of the current flowing into the battery, and the terminal voltage value.

A second aspect of the technology disclosed herein is a battery cell short circuit detection method that is executed by a computer of a battery cell short circuit detection device used for a vehicle in which a battery is installed. The battery cell short circuit detection device includes: a control unit that controls operation of a direct current-direct current converter that supplies electric power to the battery; a first acquisition unit that acquires a storage rate of the battery; a second acquisition unit that acquires a current flowing into the battery and a current flowing out of the battery when the direct current-direct current converter is operating; a third acquisition unit that acquires a terminal voltage value that is a voltage that appears at a terminal of the battery when the direct current-direct current converter is not operating; and a determination unit that determines presence or absence of the short circuit between the battery cells based on an average storage rate indicating an average value of the storage rate of the battery, an average inflow current value indicating an average value of the current flowing into the battery, and the terminal voltage value. A third aspect of the technology disclosed herein is a non-transitory storage medium storing instructions executed by a computer of the battery cell short circuit detection device.

With the battery cell short circuit detection device and the like of the present disclosure, it is possible to detect a short circuit that occurs between battery cells while suppressing a device cost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A battery cell short circuit detection device according to the present disclosure determines whether a short circuit has occurred between battery cells of a battery based on an average storage rate, an average inflow current value, and a terminal voltage value of the battery that are acquired by an acquisition unit. Since the occurrence of a short circuit between the battery cells of the battery is determined based only on the state of the battery without using other components such as a relay, it is possible to determine the occurrence of a short circuit between the battery cells while suppressing a device cost. Hereinafter, embodiments of the present disclosure will be described in detail with reference to the drawings.

Embodiments

Configuration

Figure 1:
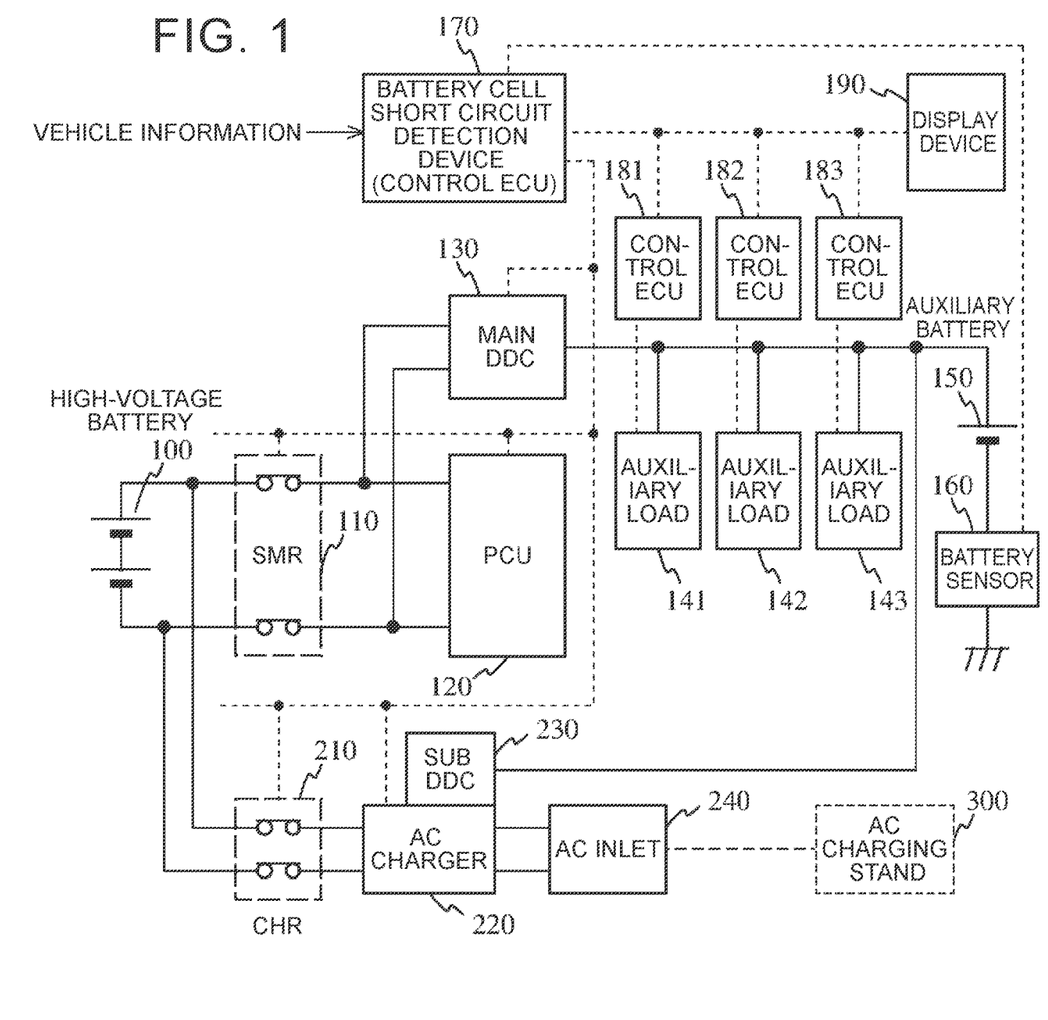
FIG. 1 is a functional block diagram showing a schematic configuration of a battery cell short circuit detection device according to an embodiment.

FIG. 1 is a functional block diagram of a battery cell short circuit detection device 170 and a periphery thereof according to the embodiment of the present disclosure. FIG. 1 illustrates functional blocks of a plug-in electric vehicle equipped with the battery cell short circuit detection device 170. The functional blocks illustrated in FIG. 1 mainly include a high-voltage battery 100, a power control unit (PCU) 120, a main direct current-direct current (DC-DC) converter (main DDC) 130, a plurality of auxiliary loads 141, 142, and 143, an auxiliary battery 150, a battery sensor 160, the battery cell short circuit detection device 170, a plurality of control electronic control units (ECUs) 181, 182, and 183, and an alternating current (AC) charger 220. In FIG. 1, signal lines for electric power are shown by solid lines, and signal lines for control or communication are shown by broken lines.

The high-voltage battery 100 is a high-voltage secondary battery, such as a lithium ion battery, which can be charged and discharged, and is a drive battery used for supplying electric power to a so-called main device mounted on a vehicle, for example. The high-voltage battery 100 is connected to the power control unit (PCU) 120 and the main DC-DC converter (main DDC) 130 via a system main relay (SMR) 110, and can supply electric power to the power control unit (PCU) 120 and the main DC-DC converter 130. The power control unit 120 is a device for controlling a predetermined device necessary for driving the vehicle such as a motor generator (not shown). Further, the high-voltage battery 100 can receive electric power from the AC charger 220 via a charge relay (CHR) 210.

The AC charger 220 is connected to an AC charging stand 300, which is an external power supply facility, via an AC inlet 240. The AC charger 220 can supply electric power to the high-voltage battery 100 and the main DC-DC converter (main DDC) 130 based on the control of a sub DC-DC converter (sub DDC) 230.

The main DC-DC converter (main DDC) 130 can output the electric power stored in the high-voltage battery 100 and the electric power supplied from the AC charger 220 to the auxiliary loads 141, 142, and 143 and the auxiliary battery 150 at a predetermined voltage. The main DC-DC converter 130 is controlled by the battery cell short circuit detection device 170 that is a control electronic control unit (ECU).

The auxiliary loads 141, 142, and 143 are so-called auxiliary devices installed in the vehicle, and are loads that consume electric power required to perform a predetermined operation. These auxiliary loads 141, 142, and 143 can be classified into, for example, a load that consumes a large amount of current in the short term, a load that consumes a large amount of current in the long term, a load that consumes a small amount of current, and the like. Although FIG. 1 shows an example in which three auxiliary load are installed in the vehicle, two or less or four or more auxiliary loads may be installed in the vehicle. The operations of the auxiliary loads 141, 142, and 143 are controlled by the control ECUs 181, 182, and 183, respectively, provided therefor.

The auxiliary battery 150 is a secondary battery, such as a lead storage battery and a lithium ion battery, which can be charged and discharged, and is a low-voltage battery used for supplying electric power to so-called auxiliary devices installed in the vehicle, for example. The auxiliary battery 150 has a structure in which a plurality of battery cells are connected in series, and the electric power output from the high-voltage battery 100 and the AC charger 220 can be stored in each battery cell. The state of the battery of the auxiliary battery 150 is monitored by the battery sensor 160. The battery sensor 160 of the present embodiment includes at least a current sensor that detects a current flowing into the auxiliary battery 150 and a current flowing out of the auxiliary battery 150, and a voltage sensor that detects a terminal voltage of the auxiliary battery 150. The current value and the voltage value detected by the battery sensor 160 are output to the battery cell short circuit detection device 170 at any time.

The battery cell short circuit detection device 170 is connected to the system main relay (SMR) 110, the power control unit (PCU) 120, the main DC-DC converter (main DDC) 130, the control ECUs 181, 182, 183, a display device 190, the charge relay (CHR) 210, and the AC charger 220 in a controllable manner. The battery cell short circuit detection device 170 of the present embodiment detects a short circuit that occurs between battery cells of the auxiliary battery 150 based on the state of the auxiliary battery 150 acquired from the battery sensor 160 and the operating state of the main DC-DC converter 130. Further, the battery cell short circuit detection device 170 controls the operating state of the main DC-DC converter 130 based on vehicle information indicating the state of the vehicle. Examples of the vehicle information include the state of a courtesy switch (SW), the state of a door lock, and the state of a start/stop push SW.

The battery cell short circuit detection device 170 may typically composed of a part or all of an electronic control unit (ECU) that includes a processor, a memory, an input/output interface, and the like. The electronic control device includes an ECU that can control the connection/disconnection state of the system main relay (SMR) 110 and the charge relay (CHR) 210, an ECU that can control the output voltage value of the main DC-DC converter (main DDC) 130, and an ECU that can monitor the state of the auxiliary battery 150, an ECU that can control the operating state of the AC charger 220, and the like. The battery cell short circuit detection device 170 realizes the function of detecting a short circuit that occurs between battery cells of the auxiliary battery 150 with the processor reading and executing a program stored in the memory.

When the vehicle equipped with the battery cell short circuit detection device 170 is an electric vehicle that is not of a plug-in charging system, the AC charger 220 and the like related to external charging are omitted from the configuration of FIG. 1. Further, when the vehicle equipped with the battery cell short circuit detection device 170 is not an electric vehicle using a motor but a vehicle using an internal combustion engine, the configuration shown in FIG. 1 may include a generator such as an alternator that supplies electric power to the main DC-DC converter (main DDC) 130.

Control

Further referring to FIGS. 2A, 2B, and 3, the control executed by the battery cell short circuit detection device 170 according to the embodiment of the present disclosure will be described.

(1) Short Circuit Occurrence Determination Control

Figure 2A:
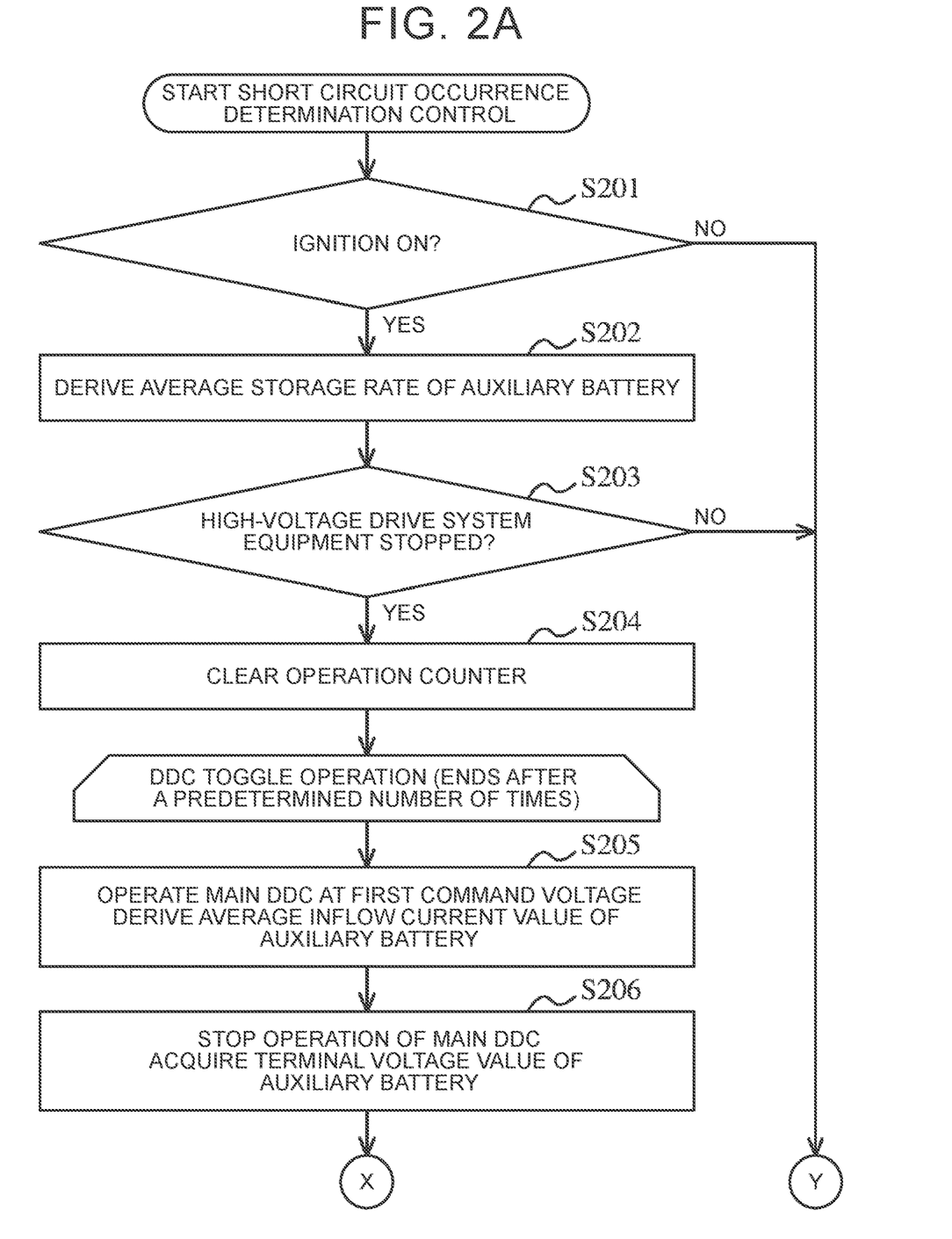
FIG. 2A is a flowchart showing a process procedure of short circuit occurrence determination control.
Figure 2B:
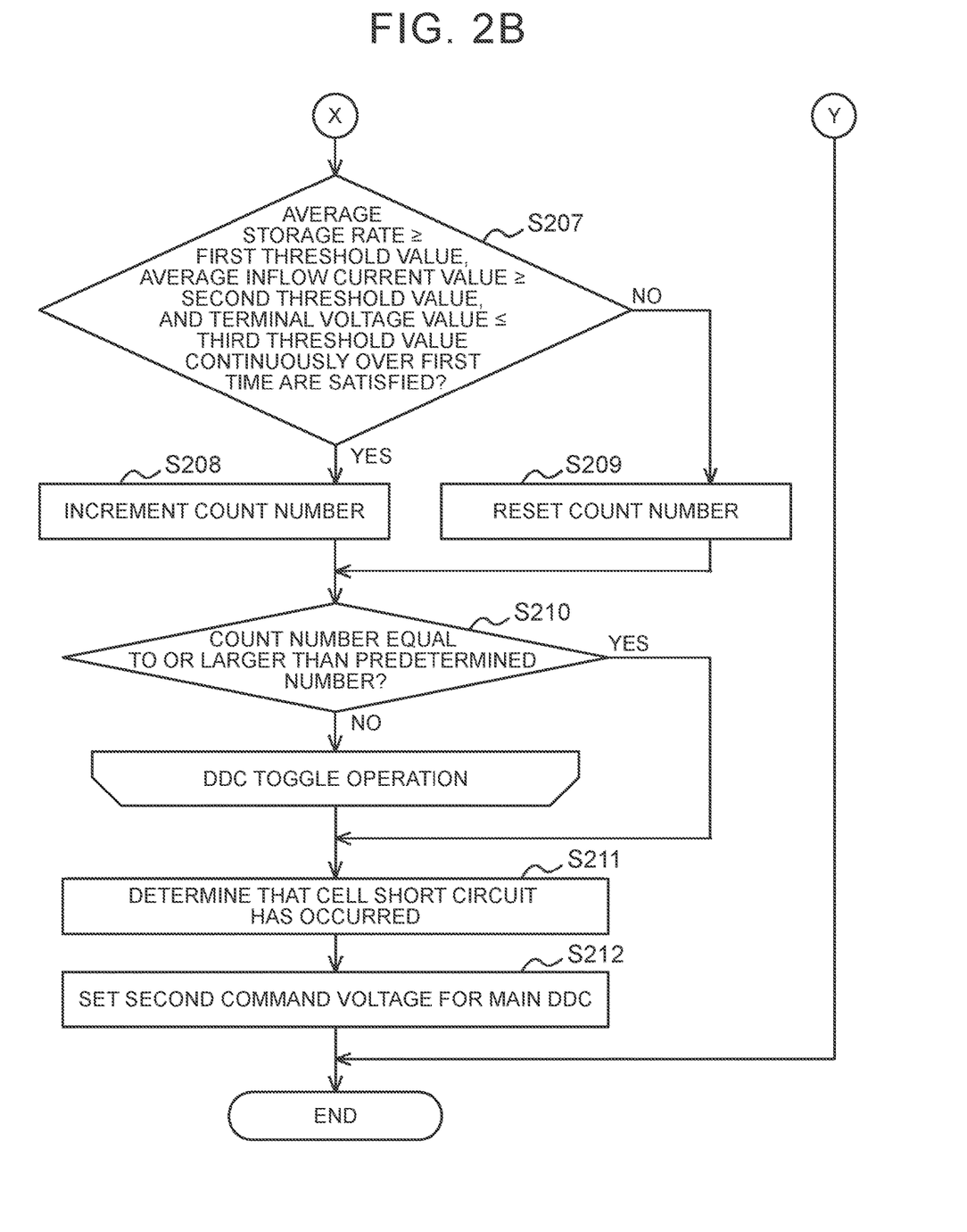
FIG. 2B is a flowchart showing a process procedure of the short circuit occurrence determination control.

FIGS. 2A and 2B are flowcharts showing a process procedure of short circuit occurrence determination control executed by the battery cell short circuit detection device 170 to determine whether a short circuit has occurred between battery cells of the auxiliary battery 150. The process of FIG. 2A and the process of FIG. 2B are connected by connections X and Y. The short circuit occurrence determination control shown in FIGS. 2A and 2B is executed while the battery cell short circuit detection device 170 is operating.

Step S201

The battery cell short circuit detection device 170 determines whether the ignition of the vehicle is in the ON (IG-ON) state. When the ignition is in the ON state (step S201, yes), the process proceeds to step S202, and otherwise (step S201, no), the short circuit occurrence determination control ends.

Step S202

The battery cell short circuit detection device 170 derives an average storage rate that is an average value of the storage rate of the auxiliary battery 150. The storage rate of the auxiliary battery 150 can be obtained by acquiring the voltage and the current detected by the battery sensor 160 (first acquisition unit) and using a well-known method based on the acquired voltage and current. The average storage rate may be an average of a plurality of storage rates newly acquired after the ignition of the battery is turned ON, or may be an average of a plurality of storage rates acquired periodically or non-periodically when the ignition of the vehicle is OFF (IG-OFF). In order to reduce an error in the cell short circuit determination described later, it is desirable to derive the storage rate when an open-end voltage (OCV) is high, that is, when the auxiliary battery 150 has a sufficient storage rate. When the average storage rate of the auxiliary battery 150 is derived, the process proceeds to step S203.

Step S203

The battery cell short circuit detection device 170 determines whether equipment of the high-voltage drive system of the vehicle is stopped. The equipment of the high-voltage drive system is a device that operates with electric power supplied from the high-voltage battery 100, such as a traction motor, which is involved in vehicle traveling. The state in which the equipment of the high-voltage drive system of the vehicle is stopped represents a state in which the vehicle cannot start moving (READY OFF) such as when the vehicle is parked. When the equipment of the high-voltage drive system is stopped (step S203, yes), the process proceeds to step S204, and otherwise (step S203, no), the short circuit occurrence determination control ends.

Step S204

The battery cell short circuit detection device 170 clears a predetermined operation counter and resets the count number to zero. The operation counter is used to measure the number of processing times of a toggle operation in which operation/non-operation of the main DC-DC converter (main DDC) 130 is repeatedly performed. When the operation counter is cleared, the process proceeds to step S205.

Step S205

The battery cell short circuit detection device 170 controls the main DC-DC converter (main DDC) 130 such that the main DC-DC converter 130 operates at a first command voltage for a predetermined first period (control unit). The first command voltage is a voltage value for charging the auxiliary battery 150. By this control, electric power is supplied from the high-voltage battery 100 to the auxiliary battery 150, or electric power is supplied from the AC charging stand 300 to the auxiliary battery 150 via the AC charger 220, so that the auxiliary battery 150 is charged. Then, the battery cell short circuit detection device 170 derives an average inflow current value that is an average value of the current flowing into the auxiliary battery 150 during the first period in which the main DC-DC converter 130 is operating. The current of the auxiliary battery 150 can be acquired from the battery sensor 160 (second acquisition unit). The average inflow current value can be derived by averaging the current that flows into the auxiliary battery 150 per unit time and that is acquired in the first period. When the average inflow current value of the auxiliary battery 150 is derived, the process proceeds to step S206.

Step S206

The battery cell short circuit detection device 170 controls the main DC-DC converter (main DDC) 130 such that the main DC-DC converter stops operating during a predetermined second period following the first period (control unit). By this control, the electric power supply from the high-voltage battery 100 and the AC charger 220 to the auxiliary battery 150 is cut off, so that the auxiliary battery 150 is not charged. Then, the battery cell short circuit detection device 170 acquires the terminal voltage value that is a voltage appearing at the terminal of the auxiliary battery 150 during the second period in which the operation of the main DC-DC converter 130 is stopped (third acquisition unit). The terminal voltage value of the auxiliary battery 150 can be acquired from the battery sensor 160. When the terminal voltage value of the auxiliary battery 150 is acquired, the process proceeds to step S207.

Step S207

The battery cell short circuit detection device 170 compares the average storage rate, the average inflow current value, and the terminal voltage value of the auxiliary battery 150 with a first threshold value, a second threshold value, and a third threshold value, respectively. The battery cell short circuit detection device 170 determines whether all the following conditions are satisfied: the average storage rate is equal to or higher than the first threshold value, the average inflow current value is equal to or larger than the second threshold value, and the terminal voltage value is equal to or smaller than the third threshold value continuously over the first time. Thus, the first threshold value is set to a value (for example, 90%) at which it can be determined that the storage rate of the auxiliary battery 150 is sufficient. The second threshold value is set to a value (for example, 100 A) at which it can be determined that a sufficient amount of current (for example, equivalent to X % of the amount of power generated by the main DC-DC converter 130) is flowing into the auxiliary battery 150. The first time and the third threshold value are set values at which it can determined that the auxiliary battery 150 is not charged (for example, 11.5 V when the battery temperature is 30° C. or higher). When all of the above conditions are satisfied (step S207, yes), the process proceeds to step S208, and when not all of the above conditions are satisfied (step S207, no), the process proceeds to step S209.

Step S208

The battery cell short circuit detection device 170 increments the count number of the operation counter by one. When the count number is incremented, the process proceeds to step S210.

Step S209

The battery cell short circuit detection device 170 resets the count number of the operation counter to zero. When the count number is reset, the process proceeds to step S210.

Step S210

The battery cell short circuit detection device 170 determines whether the count number of the operation counter is equal to or larger than a predetermined number. The determination is made to confirm that, while the operation of the main DC-DC converter 130 is stopped, the average storage rate of the auxiliary battery 150 is high and the average inflow current value flowing into the auxiliary battery 150 is large but the terminal voltage value of the auxiliary battery 150 is continuously low over the second time (=one cycle of toggle operation×predetermined number). Thus, the predetermined number is set to a suitable number (for example, 2) at which it can be determined that the auxiliary battery 150 is not charged. When the count number is equal to or larger than the predetermined number (step S210, yes), the process proceeds to step S211. When the count number is smaller than the predetermined number (step S210, no), the process proceeds to step S205.

The process of the DDC toggle operation shown in steps S205 to S210 is repeatedly executed (the first period and the second period are repeatedly executed), and is continued to be executed until the condition of step S210 is satisfied or the number of times of repetitions reaches a predetermined number of times. The first period, the second period, and the predetermined number of times can be appropriately set based on, for example, physical characteristics (internal resistances, capacities), the states during the process (storage rates, voltages, currents, temperatures), and the like of the high-voltage battery 100 and the auxiliary battery 150. Further, the processing order of the steps S205 and S206 may be reversed.

Step S211

The battery cell short circuit detection device 170 determines that a short circuit has occurred between the battery cells in the auxiliary battery 150 (determination unit). The result of the determination can be shown, for example, by setting a predetermined flag (cell short circuit occurrence flag) indicating that a cell short circuit has occurred to ON. When it is determined that a cell short circuit has occurred, the process proceeds to step S212.

Step S212

The battery cell short circuit detection device 170 sets the command voltage when operating the main DC-DC converter (main DDC) 130 to a second command voltage. The second command voltage is a voltage value for suppressing an excessive current from flowing to the auxiliary battery 150 in which a short circuit has occurred between battery cells, and is set to be lower than the above-mentioned first command voltage. By this control, it is possible to reduce a phenomenon such as overcharging which is a concern arising due to the occurrence of a cell short circuit. When the command voltage for the main DC-DC converter 130 is set to the second command voltage, the short circuit occurrence determination control ends.

(2) Short Circuit Elimination Determination Control

Figure 3:
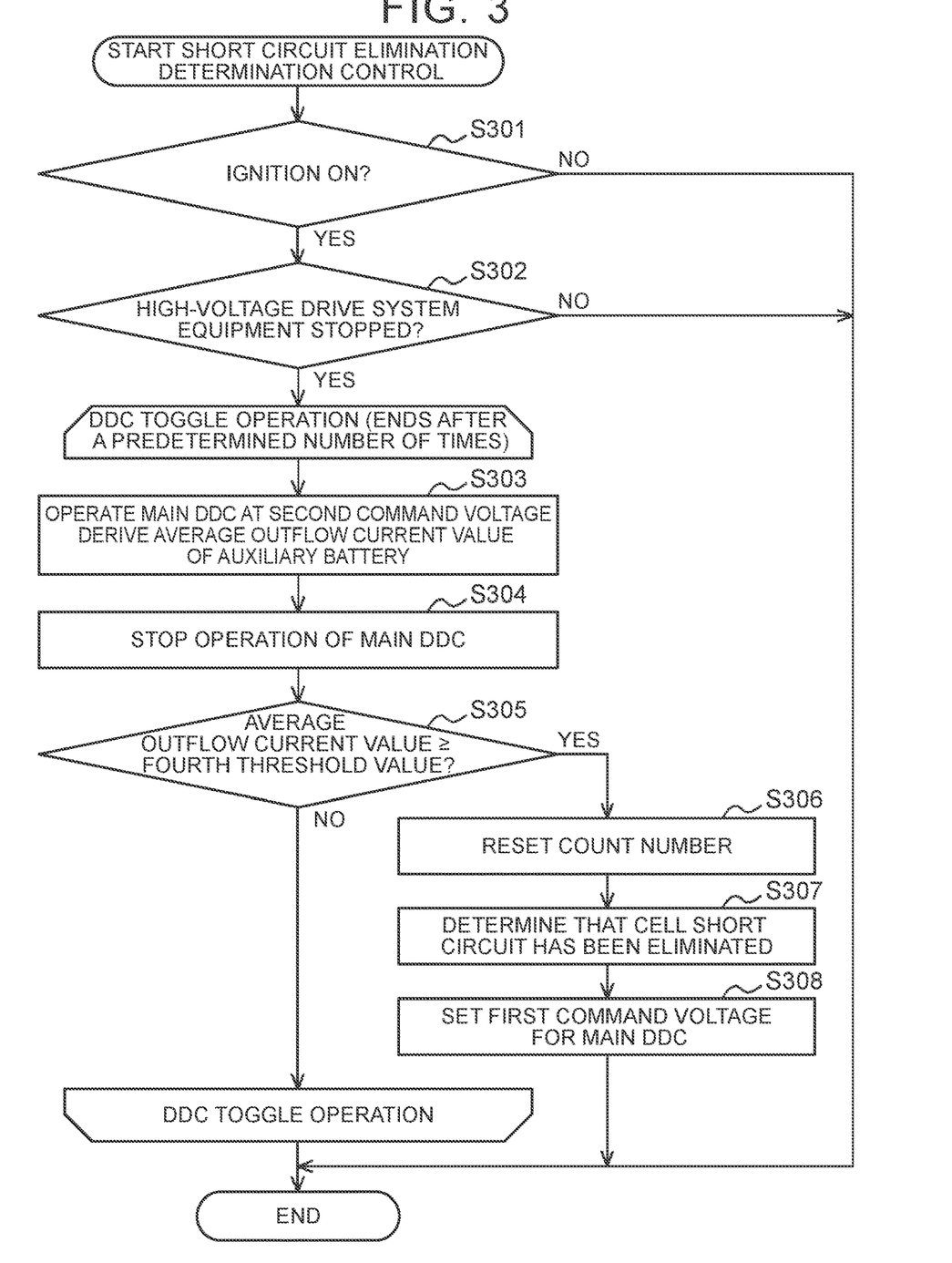
FIG. 3 is a flowchart showing a process procedure of short circuit elimination determination control.

FIG. 3 is a flowchart showing a short circuit elimination determination control to determine whether the short circuit between the battery cells of the auxiliary battery 150 is eliminated which is executed by the battery cell short circuit detection device 170 after the determination of occurrence of the short circuit between the battery cells of the auxiliary battery 150.

The short circuit elimination determination control shown in FIG. 3 is executed after it is determined in step S211 of FIG. 2B described above that a short circuit has occurred between battery cells of the auxiliary battery 150 (the cell short circuit occurrence flag is set to ON).

Step S301

The battery cell short circuit detection device 170 determines whether the ignition of the vehicle is in the ON (IG-ON) state. When the ignition is in the ON state (step S301, yes), the process proceeds to step S302, and otherwise (step S301, no), the short circuit elimination determination control ends.

Step S302

The battery cell short circuit detection device 170 determines whether the equipment of the high-voltage drive system of the vehicle is stopped. The equipment of the high-voltage drive system and the state in which the equipment is stopped are as described above. When the equipment of the high-voltage drive system is stopped (step S302, yes), the process proceeds to step S303, and otherwise (step S302, no), the short circuit elimination determination control ends.

Step S303

The battery cell short circuit detection device 170 controls the main DC-DC converter (main DDC) 130 such that the main DC-DC converter 130 operates at a second command voltage for a predetermined third period. The second command voltage is a voltage value set to be lower than the above-mentioned first command voltage. Then, the battery cell short circuit detection device 170 derives an average outflow current value that is an average value of the current flowing out of the auxiliary battery 150 during the third period in which the main DC-DC converter 130 is operating. The current of the auxiliary battery 150 can be acquired from the battery sensor 160. The average outflow current value can be derived by averaging the current that flows out of the auxiliary battery 150 per unit time and that is acquired in the predetermined period. When the average outflow current value of the auxiliary battery 150 is derived, the process proceeds to step S304.

Step S304

The battery cell short circuit detection device 170 controls the operation of the main DC-DC converter (main DDC) 130 such that the main DC-DC converter 130 stops operating during a predetermined fourth period following the third period. When the operation of the main DC-DC converter 130 is stopped, the process proceeds to step S305.

Step S305

The battery cell short circuit detection device 170 compares the average outflow current value of the auxiliary battery 150 with a fourth threshold value to determine whether the average outflow current value is equal to or larger than the fourth threshold value. This determination is made to confirm that the current is flowing out of the auxiliary battery 150 although the main DC-DC converter 130 (main DDC) 130 is being charged at the second command voltage. Thus, the fourth threshold value is set to a value at which it can be determined that the current is flowing out of the auxiliary battery 150. When the average outflow current value is equal to or larger than the fourth threshold value (step S305, yes), the process proceeds to step S306, and when the average outflow current value is smaller than the fourth threshold value (step S305, no), the process proceeds to step S303.

Step S306

The battery cell short circuit detection device 170 resets the count number of the operation counter to zero. When the count number is reset, the process proceeds to step S307.

Step S307

The battery cell short circuit detection device 170 determines that the short circuit that occurred between the battery cells of the auxiliary battery 150 has been eliminated. The result of the determination can be shown, for example, by setting the cell short circuit occurrence flag indicating that a cell short circuit has occurred to OFF. When it is determined that the cell short circuit has been eliminated, the process proceeds to step S308.

Step S308

The battery cell short circuit detection device 170 sets the command voltage when operating the main DC-DC converter (main DDC) 130 to the first command voltage. Thereby, the main DC-DC converter 130 is operated so that the auxiliary battery 150 can be charged with electric power supplied from the high-voltage battery 100 and the AC charging stand 300. Thus, it is possible to reduce an event that the auxiliary battery 150 runs out when the occurrence of a cell short circuit is erroneously determined. When the command voltage of the main DC-DC converter 130 is set to the first command voltage, the short circuit elimination determination control ends.

The process of the DDC toggle operation shown in steps S303 to S305 is repeatedly executed (the third period and the fourth period are repeatedly executed), and is continued to be executed until the condition of step S305 is satisfied or the number of times of repetitions reaches a predetermined number of times. The third period, the fourth period, and the predetermined number of times can be appropriately set based on, for example, physical characteristics (internal resistances, capacities), the states during the process (storage rates, voltages, currents, temperatures), and the like of the high-voltage battery 100 and the auxiliary battery 150.

Operations and Effects

As described above, the battery cell short circuit detection device 170 according to the embodiment of the present disclosure determines whether a short circuit has occurred between battery cells of the auxiliary battery 150 based on the average storage rate, the average inflow current value, and the terminal voltage value of the auxiliary battery 150 that are detected by the battery sensor 160. Specifically, in the toggle operation in which the operation/non-operation of the main DC-DC converter (main DDC) 130 is repeatedly performed, the battery cell short circuit detection device 170 determines that a short circuit has occurred between battery cells of the auxiliary battery 150, when the average storage rate obtained from the detected value of the battery sensor 160 is equal to or larger than the first threshold value, the average inflow current value detected by the battery sensor 160 during the operation of the main DC-DC converter 130 is equal to or larger than the second threshold value, and the terminal voltage value detected by the battery sensor 160 when the operation of the main DC-DC converter 130 is stopped is equal to or smaller than the third threshold value continuously over the first time.

Thus, since the occurrence of a short circuit between the battery cells of the auxiliary battery 150 is determined based only on the state of the auxiliary battery 150 without using other components such as a relay, it is possible to determine the occurrence of a short circuit between the battery cells while suppressing a device cost.

Further, the battery cell short circuit detection device 170 determines whether the short circuit that occurred between the battery cells of the auxiliary battery 150 is eliminated based on the average outflow current value of the auxiliary battery 150 that is detected by the battery sensor 160. Specifically, in the toggle operation in which the operation/non-operation of the main DC-DC converter (main DDC) 130 is repeatedly performed, when the outflow current value is continuously detected with the auxiliary battery 150 being charged, the battery cell short circuit detection device 170 determines that the short circuit that occurred between the battery cells of the auxiliary battery 150 has been eliminated.

Through this process, it is possible to quickly detect that the short circuit between the battery cells of the auxiliary battery 150, which has temporarily occurred for some reason, has been eliminated due to the elimination of a cause for the short circuit. Further, for example, even when a short circuit between the battery cells of the auxiliary battery 150 is erroneously determined due to the influence of disturbance noise or the like, the error can be quickly corrected.

Although one embodiment of the present disclosure has been described above, the present disclosure can be regarded as a battery cell short circuit detection device, a short circuit detection method executed by the battery cell short circuit detection device, a short circuit detection control program, a computer-readable con-transitory storage medium storing the short circuit detection control program, or a vehicle equipped with the battery cell short circuit detection device.

The battery cell short circuit detection device and the like of the present disclosure can be used for a vehicle equipped with a battery in which a plurality of battery cells are connected in series.

What is claimed is:

1. A battery cell short circuit detection device for detecting a short circuit between battery cells in a battery in which a plurality of battery cells are connected in series, the battery cell short circuit detection device comprising:
   a control unit that controls operation of a direct current-direct current converter that supplies electric power to the battery;
   a first acquisition unit that acquires a storage rate of the battery;
   a second acquisition unit that acquires a current flowing into the battery and a current flowing out of the battery when the direct current-direct current converter is operating;
   a third acquisition unit that acquires a terminal voltage value that is a voltage that appears at a terminal of the battery when the direct current-direct current converter is not operating; and
   a determination unit that determines presence or absence of the short circuit between the battery cells based on an average storage rate indicating an average value of the storage rate of the battery, an average inflow current value indicating an average value of the current flowing into the battery, and the terminal voltage value.

2. The battery cell short circuit detection device according to claim 1, wherein the determination unit determines the presence or absence of the short circuit between the battery cells when a condition is satisfied, the condition being a condition that the average storage rate is equal to or higher than a first threshold value, the average inflow current value is equal to or larger than a second threshold value, and the terminal voltage value is equal to or smaller than a third threshold value continuously over a first time.

3. The battery cell short circuit detection device according to claim 2, wherein the determination unit determines that there is the short circuit between the battery cells when a state in which the condition is satisfied continues over a second time in a control in which the control unit switches operation and non-operation of the direct current-direct current converter a plurality of times.

4. The battery cell short circuit detection device according to claim 3, wherein the determination unit determines that there is no short circuit between the battery cells in a case where an average outflow current value indicating an average value of the current flowing out of the battery is equal to or larger than a fourth threshold value when the direct current-direct current converter is operating after the determination unit determines that there is the short circuit between the battery cells.

5. The battery cell short circuit detection device according to claim 1, wherein:

the battery cell short circuit detection device is installed in a vehicle;

while the vehicle is parked, the control unit controls the operation of the direct current-direct current converter; and the determination unit determines the presence or absence of the short circuit between the battery cells.

6. A battery cell short circuit detection method that is executed by a computer of a battery cell short circuit detection device used for a vehicle in which a battery is installed, the battery cell short circuit detection method comprising:

a step of controlling operation of a direct current-direct current converter that supplies electric power to the battery;

a step of acquiring a storage rate of the battery;

a step of acquiring a current flowing into the battery and a current flowing out of the battery when the direct current-direct current converter is operating;

a step of acquiring a terminal voltage value that is a voltage that appears at a terminal of the battery when the direct current-direct current converter is not operating; and a step of determining presence or absence of the short circuit between the battery cells based on an average storage rate indicating an average value of the storage rate of the battery, an average inflow current value indicating an average value of the current flowing into the battery, and the terminal voltage value.

7. A non-transitory storage medium storing instructions that are executable by a computer and that cause the computer to perform functions comprising:

a step of controlling operation of a direct current-direct current converter that supplies electric power to the battery;

a step of acquiring a storage rate of the battery;

a step of acquiring a current flowing into the battery and a current flowing out of the battery when the direct current-direct current converter is operating;

a step of acquiring a terminal voltage value that is a voltage that appears at a terminal of the battery when the direct current-direct current converter is not operating; and a step of determining presence or absence of the short circuit between the battery cells based on an average storage rate indicating an average value of the storage rate of the battery, an average inflow current value indicating an average value of the current flowing into the battery, and the terminal voltage value.

\* \* \* \* \*